(12) United States Patent
Ausman et al.

(10) Patent No.: US 6,237,857 B1
(45) Date of Patent: May 29, 2001

(54) THREE-WAY ACTUATION CONTROL OF A HYDRAULICALLY ACTUATED FUEL INJECTOR

(75) Inventors: Thomas G. Ausman, Metamora; Manas R. Satapathy, Peoria; Scott R. Schuricht, Normal, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/372,550

(22) Filed: Aug. 11, 1999

(51) Int. Cl.⁷ .................................................. F02M 51/00
(52) U.S. Cl. ............................ 239/5; 137/625.64; 239/96
(58) Field of Search ..................... 137/625.64; 239/96, 239/5

(56) References Cited

U.S. PATENT DOCUMENTS

| | | |
|---|---|---|
| 3,079,948 | 3/1963 | Allen . |
| 3,972,350 | 8/1976 | Pickett ............................ 137/624.18 |
| 4,223,698 | 9/1980 | Reinicke ............................ 137/595 |
| 4,325,127 | 4/1982 | Major ............................... 364/510 |
| 4,488,576 | 12/1984 | Skelly ............................ 137/625.21 |
| 4,554,942 | 11/1985 | Williams et al. .................... 137/240 |
| 4,595,034 | 6/1986 | Hutson ............................ 137/625.21 |
| 4,813,601 | 3/1989 | Schwerdt et al. ...................... 239/91 |
| 4,964,434 | 10/1990 | Bieri ..................................... 137/567 |
| 5,129,424 | 7/1992 | Stephenson et al. ............ 137/625.24 |
| 5,217,045 | 6/1993 | Gramm .................................. 137/595 |
| 5,479,901 | 1/1996 | Gibson et al. ........................ 123/472 |
| 5,601,115 | 2/1997 | Broerman .......................... 137/595 |
| 5,894,992 | 4/1999 | Liu et al. .............................. 239/91 |
| 6,050,496 | * 4/2000 | Hefler .................................... 239/96 |
| 6,050,497 | * 1/2000 | Cotton .................................. 239/96 |

* cited by examiner

*Primary Examiner*—Gerald A. Michalsky
(74) *Attorney, Agent, or Firm*—Eric M. Bram

(57) ABSTRACT

An actuation fluid control valve assembly for a hydraulically actuated fuel injector comprises a valve body defining a rotary valve bore and a spool valve bore. An actuator is connected with the valve body. A rotary valve member is rotatably disposed in the rotary valve bore and can be rotated in response to the actuator. A high-pressure fluid line, a spool bottom line, a check control line, and an actuator fluid drain all terminate in the rotary valve bore. At one rotary valve position, both the check control line and the spool bottom line are open to the high-pressure line. Moving the rotary valve from the first position to a second position opens the spool bottom line to the actuator fluid drain while keeping the check control line open to the high-pressure line. Moving the rotary valve from the second position to a third position opens the check control line as well as the spool bottom line to the actuator fluid drain.

14 Claims, 5 Drawing Sheets

Fig_1_

Fig_2_

Fig_3_

Fig_4_

Fig_5_

Fig_6_

Fig_7_

Fig_8_

THREE-WAY ACTUATION CONTROL OF A HYDRAULICALLY ACTUATED FUEL INJECTOR

TECHNICAL FIELD

This invention relates generally to fuel injectors, and more particularly to valves for controlling hydraulically actuated fuel injectors.

BACKGROUND AND SUMMARY

Known hydraulically-actuated fuel injection systems and/or components are shown, for example, in U.S. Pat. Nos. 5,687,693 and 5,738,075 issued to Chen and Hafner et al. on Nov. 18, 1997 and Apr. 14, 1998, respectfully.

In these hydraulically actuated fuel injectors, a spring biased needle check opens to commence fuel injection when pressure is raised by an intensifier piston/plunger assembly to a valve opening pressure. The intensifier piston is acted upon by a relatively high pressure actuation fluid, such as engine lubricating oil, when an actuator driven actuation fluid control valve, for example a solenoid driven actuation fluid control valve, opens the injector's high pressure inlet.

Injection is ended by operating the actuator to release pressure above the intensifier piston. This in turn causes a drop in fuel pressure causing the needle check to close under the action of its return spring and end injection.

Recently, Caterpillar Inc. has developed a new generation of fuel injectors, such as the HEUI-B™ fuel injector, that feature direct control of the spring biased needle check valve. In these fuel injectors, even when fuel pressure has been raised by the intensifier piston to the valve opening pressure, the check valve can be kept shut (or quickly shut if it is open) by applying high pressure hydraulic fluid directly to the back of the needle check valve.

A critical component of both types of hydraulically actuated fuel injector is the actuation fluid control valve, which admits the high pressure actuating fluid to the injector. In the HEUI-B™ type injectors the actuation fluid control valve is especially critical because it must be able to control both the intensifier piston and the check valve.

In a yet-to-be-released HEUI-B™ fuel injector described in co-pending patent application Ser. No. 09/1358,990 filed Jul. 22, 1999 and entitled "Hydraulically Actuated Fuel Injector with Seated Pin Actuator" a two-way valve is used both to apply direct control on the check valve, and also to operate the spool valve that controls actuation of an intensifier piston.

Figure 1:
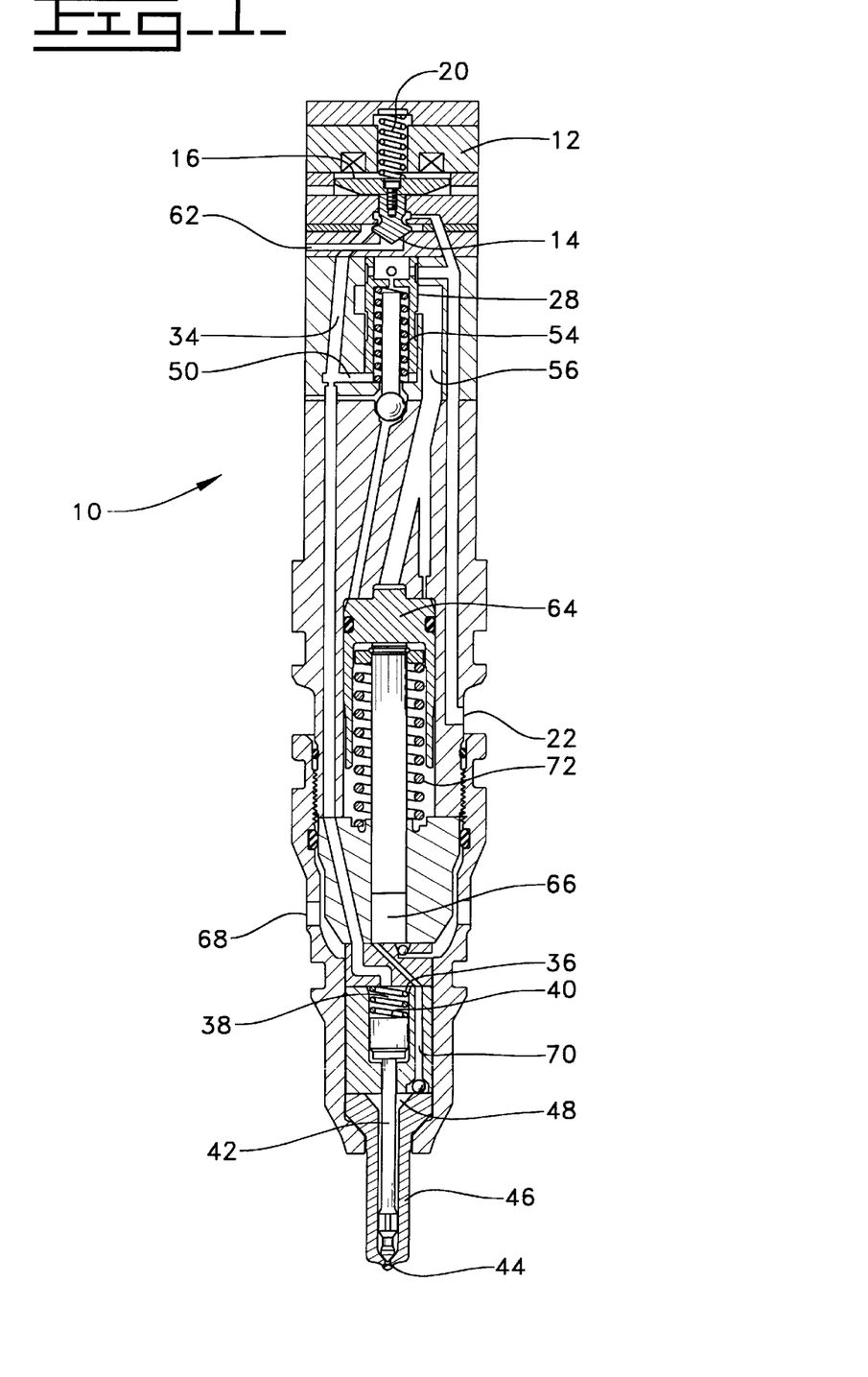
FIG. 1 is a diagrammatic side view representation of an embodiment of a hydraulically actuated fuel injector having a seated pin valve.
Figure 2:
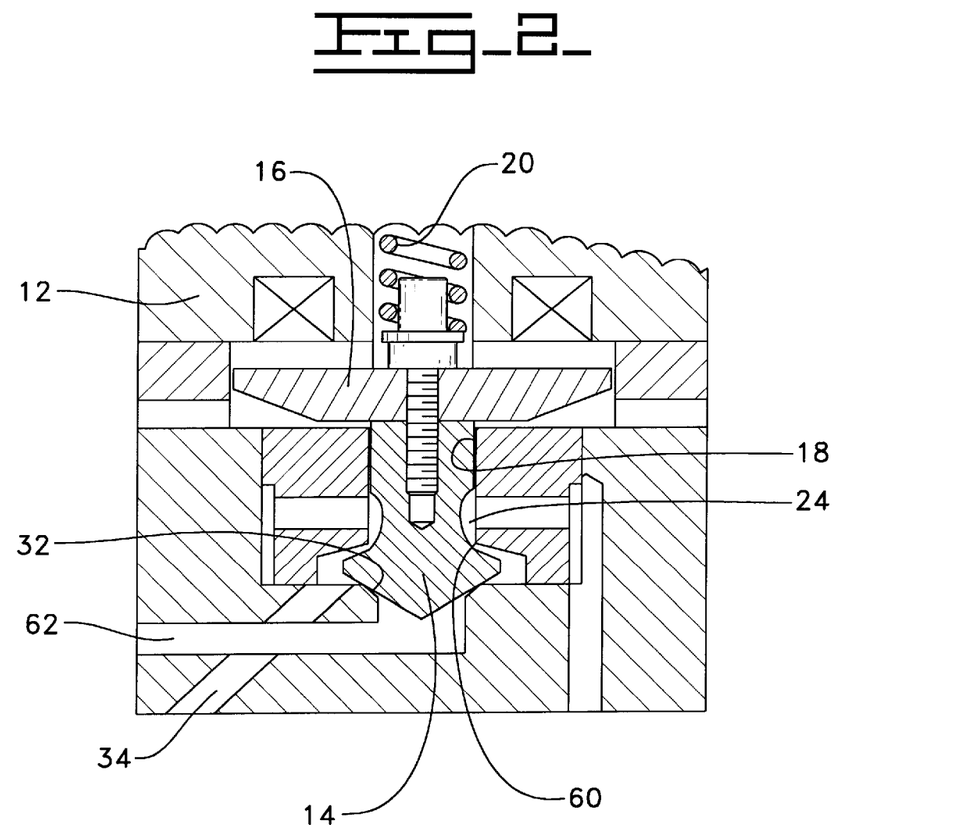
FIG. 2 is a diagrammatic side view representation of an embodiment of a hydraulically actuated fuel injector similar to the fuel injector of FIG. 1.
Figure 3:
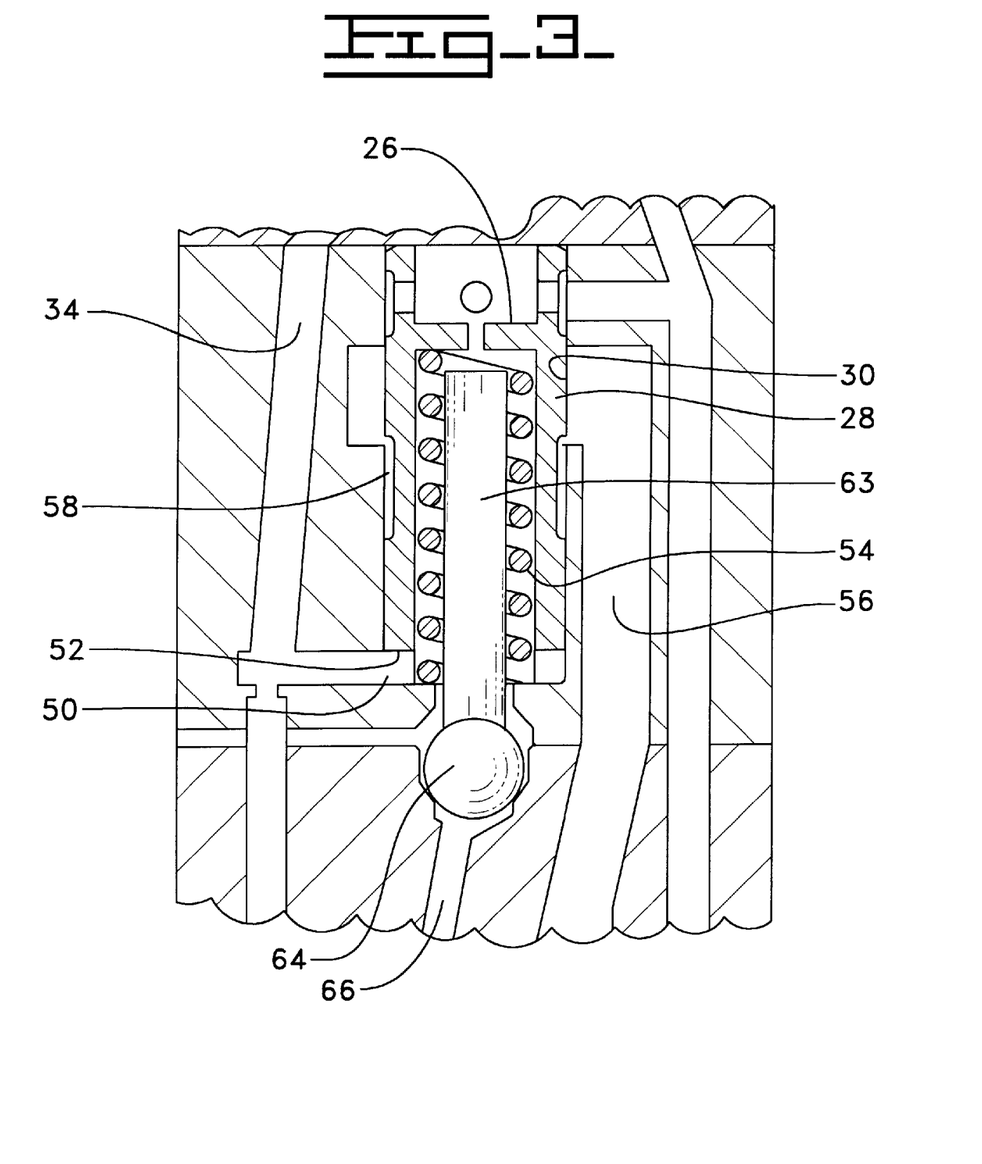
FIG. 3 is a diagrammatic side view representation of a spool valve portion of the fuel injector of FIG. 2.

Embodiments of the HEUI-B™ type injectors with a seated pin actuator valve are described below with reference to FIGS. 1–3. The fuel injector 10 utilizes an actuation fluid control valve including a single attractive two-way solenoid 12. An armature assembly includes an actuation valve member 14 attached with an armature 16. The solenoid 12 pulls the armature assembly upward in an actuator bore 18. An actuator spring 20 biases the armature 16 and the attached actuation valve member 14 downward.

High-pressure actuation fluid from a hydraulic fluid source, such as a common rail (not shown) that feeds a number of fuel injectors for example, enters the fuel injector 10 through an actuation fluid inlet 22. A fluid entry chamber 24 (FIG. 2) in the actuation fluid control valve is always exposed to the high pressure actuation fluid, as is an upper end hydraulic surface 26 (FIG. 3) of a spool valve member 28 that is slidable up and down in a spool valve bore 30.

The actuation fluid control valve operates as follows. At a first position the solenoid 12 is de-energized and the actuator spring 20 pushes the valve member 14 downward to mate with a drain seat 32. In this position high-pressure actuation fluid flows from the fluid entry chamber 24 into a check control cavity 34.

The high-pressure actuation fluid in the check control cavity 34 flows down into a check control chamber 36, at which time the high pressure actuation fluid together with a check spring 38 act on a closing hydraulic surface 40 of a check valve member 42 to close nozzle outlets 44 of a nozzle 46. This keeps fuel in a nozzle chamber 48 from being injected into an engine for example.

The high pressure actuation fluid in the check control cavity 34 also flows into a side passage 50 where it acts against a lower end hydraulic surface 52 of the spool valve member 28. This balances the hydraulic fluid pressure against the upper end hydraulic surface 26 of the spool valve member 28, so that a spool valve spring 54 can keep the spool valve member 28 in an up position that closes off an intensifier control passage 56 from the source of high pressure actuation fluid, while opening the intensifier control passage 56 to a low pressure hydraulic fluid drain 58.

When the solenoid 12 is energized it pulls the actuation valve member 14 upward against an inlet seat 60. This closes off the check control cavity 34 from the source of high-pressure hydraulic fluid in the fluid entry chamber 24, while opening the check control cavity 34 to a low-pressure actuator fluid drain 62. This reduces fluid pressure in the check control chamber 36 so that only the force of the check spring 38 is acting on the closing hydraulic surface 40 of the check valve member 42.

This also reduces fluid pressure against the lower end hydraulic surface 52 of the spool valve member 28. When this happens, the force of the high pressure actuation fluid on the upper end hydraulic surface 26 of the spool valve member 28 overcomes the force of the spool valve spring 54 and pushes the spool valve member 28 downward. This closes off the intensifier control passage 56 from the hydraulic fluid drain 58, while opening the intensifier control passage 56 to the source of high-pressure actuation fluid.

The high pressure actuation fluid in the intensifier control passage 56 pushes down on an intensifier piston 64, pressurizing fuel in a fuel pressurization chamber 66 that has entered from a fuel inlet 68 connected to a source of low pressure fuel (not shown). The highly pressurized fuel flows through a connection passage 70 to the nozzle chamber 48 until fuel pressure in the nozzle chamber 48 is high enough to overcome the bias of the check spring 38 and push the check valve member 42 upward, which opens the nozzle outlets 44 and allows the fuel in the nozzle chamber 48 to be injected from the fuel injector 10.

To terminate fuel injection the actuator 12 is de-energized, allowing the actuator spring 20 to move the actuation valve member 14 back to the first position. In this position the check control cavity 34 is closed off from the actuator fluid drain 62, and is fluidly connected to high-pressure actuation fluid from the actuation fluid inlet 22. This causes high pressure actuation fluid to be applied to the lower end hydraulic surface 52 of the spool valve member 28, once again balancing the force of the high pressure actuation fluid against the upper end hydraulic surface 26 of the spool valve member 28.

The bias provided by the spool valve spring 54 can now move the spool valve member 28 upward to cut off the supply of high pressure actuation fluid from the intensifier control passage 56 and to relieve the pressure in the intensifier control passage 56 by exposing it to the hydraulic fluid drain 58. Bias provided by a plunger spring 72 is now able to push the intensifier piston 64 upward. This reduces the pressure of the fuel in the fuel pressurization chamber 66, and hence in the nozzle chamber 48, allowing the bias provided by the check spring 38 to push the check valve member 42 toward its closed position.

However, it takes some time for the high-pressure actuation fluid to move the spool valve member 28 to relieve pressure against the intensifier piston 64. The high pressure actuation fluid in the check control cavity 34 reaches the check control chamber 36 and acts upon the low mass check valve member 42 much more quickly. Even though the nozzle chamber 48 still contains highly pressurized fuel, the combination of the increased pressure in the check control chamber 36 and the bias provided by the check spring 38 overcomes the pressure of the fuel in the nozzle chamber 48. This causes the check valve member 42 to shut immediately, providing a much more abrupt end to the injection cycle than can be obtained otherwise.

Because of this hysteresis affect, the actuator 12 can be turned rapidly on and off to directly control the check valve member 42 by acting on its closing hydraulic surface 40, before the spool valve has released pressure pushing against the intensifier piston 64. Doing this can achieve split injection, that is, two or more injection "shots" in the same fuel injection cycle. In fact, the check valve member 42 can be made to open and close a great many times, as desired, at any time during the injection cycle. For example, this feature can be used to cause a short delay after a "pilot" fuel injection at the beginning of an injection cycle in order to reduce engine emissions or for other reasons.

This seated pin design provides excellent results. To obtain split injection in the same fuel injection cycle using the seated pin valve, the seated pin actuator is turned off to end injection in the first shot, and then turned on again to start injection in the second shot. Controlling the actuation times of the seated pin controls the time interval (separation) between the first and the second shots.

When the separation between two shots is small, inertia of the spool valve helps to maintain pressure on the intensifier piston and the second shot has good injection characteristics. But as the separation increases, the time available for the spool to return and drain the pressure on top of the intensifier increases. In other words, the intensifier top pressure is variable. This causes injection characteristics of the second shot to be a function of the separation.

Test data have also shown that the higher the separation, the more erratic the second shot becomes. These effects are due to the varying levels of pressure on top of the intensifier piston 64. The present invention is directed to addressing one or more of the concerns set forth above.

DISCLOSURE OF THE INVENTION

In one aspect of the invention, an actuation fluid control valve assembly for a hydraulically actuated fuel injector comprises a valve body defining a rotary valve bore and a spool valve bore. An actuator is connected with the valve body. A rotary valve member is rotatably disposed in the rotary valve bore. A high-pressure fluid line, a spool bottom line, a check control line, and a actuator fluid drain all terminate in the rotary valve bore.

The actuator fluid drain is fluidly isolated from the high-pressure fluid line by the rotary valve member. A spool valve member is slidably disposed in the spool valve bore between a first spool valve bore portion of the spool valve bore and a second spool valve bore portion of the spool valve bore. The first spool valve bore portion is fluidly connected with a high-pressure fluid passage, and a second pressurization portion is fluidly connected with the spool bottom line.

The rotary valve member is rotatable in response to the actuator to a first position at which both the check control line and the spool bottom line are fluidly connected with the high pressure fluid line, from the first position to a second position at which the check control line is fluidly connected with the high pressure fluid line and the spool bottom line is fluidly connected with the actuator fluid drain, and from the second position to a third position at which both the check control line and the spool bottom line are fluidly connected with the actuator fluid drain.

The rotary valve member is also rotatable in response to the actuator from the third position to the second position, and from the second position to the first position.

BRIEF DESCRIPTION OF THE DRAWINGS

For a better understanding of the present invention, reference may be made to the accompanying drawing figures, which are illustrative and not necessarily drawn to scale, and in which.

DETAILED DESCRIPTION

FIGS. 4–7 illustrate an upper portion of an embodiment of a hydraulically actuated fuel injector 74 with a rotary valve 76 according to the invention. The fuel injector 74 has many elements in common with the previously described hydraulically actuated fuel injector 10, so that the bottom half of the fuel injector 74 is similar to the previously described fuel injector 10. Accordingly, similarly numbered elements 22, 36–48, 64–72 in the bottom portion of the fuel injector 74 can be understood with reference to FIG. 1.

Figure 4:
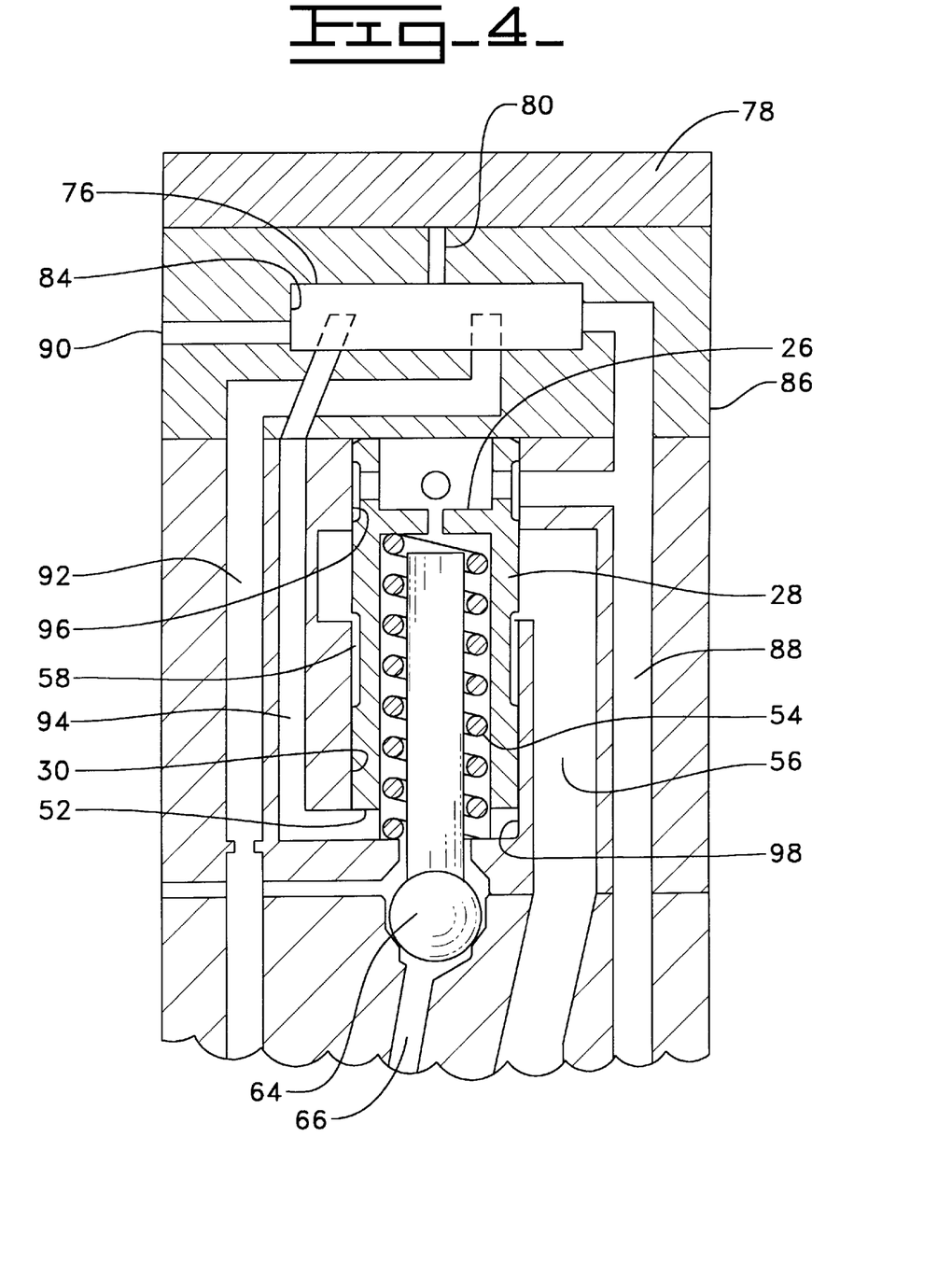
FIG. 4 is a diagrammatic side view representation of an embodiment of an upper section of a hydraulically actuated fuel injector with a rotary valve according to the invention.

A rotary actuator 78 according to the invention utilizing a stepped motor for example rotates an axial member 80 to drive a rotary valve member 82 within a rotary valve bore 84 in a valve body 86. FIG. 4 shows the rotary valve member 82 in a first rotary valve position discussed below. A high pressure hydraulic fluid inlet line (high pressure fluid line) 88 that supplies high pressure hydraulic fluid from the actuation fluid inlet 22, a low pressure actuator fluid drain 90, a check control line 92, and a spool bottom feed line 94, all fluidly connect with the rotary valve 76 at the rotary valve bore 84. The rotary valve member 82 divides the rotary valve bore 84 into separate fluid connecting sections as it rotates.

FIG. 4 also shows the spool valve portion of this embodiment of the invention. The spool valve member 28 is slidably disposed in the spool valve bore 30 between a first spool valve bore portion 96 and a second spool valve bore portion 98 of the spool valve bore 30. A high pressure fluid passage 99 constantly feeds into the first spool valve bore portion 96, and the spool bottom feed line 94 feeds into the second spool valve bore portion 98. In the illustrated embodiment the high pressure fluid passage 99 is merely a side passage off the high pressure fluid line 88, but of course in other embodiments the high pressure fluid passage could originate elsewhere, for example directly from the high pressure rail or another source.

Figure 5:
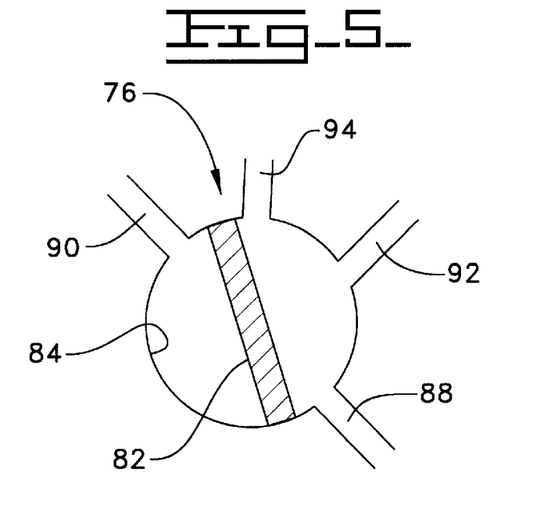
FIG. 5 is a diagrammatic top view representation the rotary valve of FIG. 4.
Figure 6:
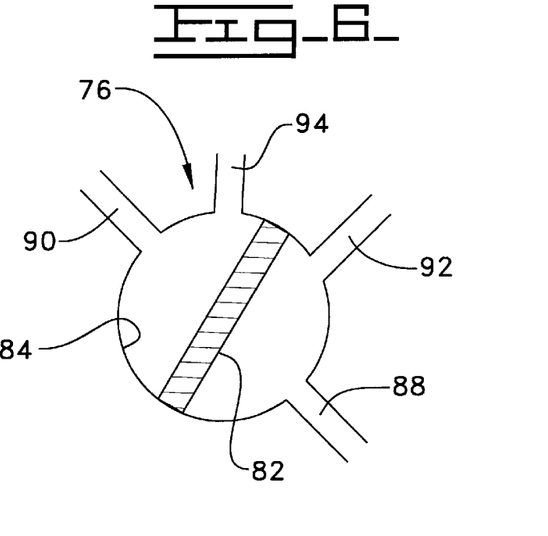
FIG. 6 is a diagrammatic top view representation of the rotary valve of FIGS. 4 and 5 in a second operating position.
Figure 7:
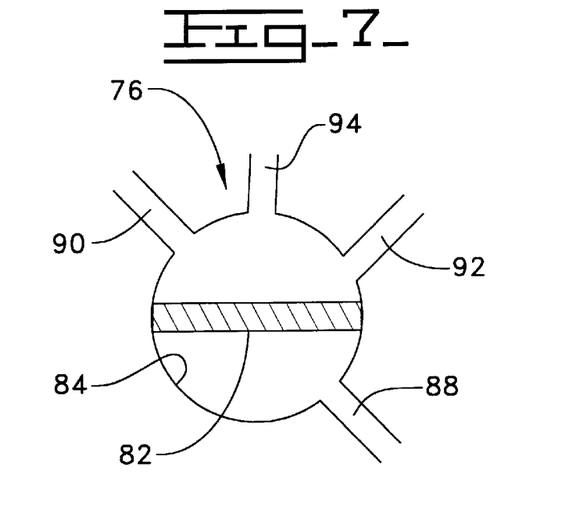
FIG. 7 is a diagrammatic top view representation of the rotary valve of FIGS. 4–6 in a third operating position.

FIGS. 5–7 illustrate three different positions for the rotary valve member 82 of the rotary valve 76. FIGS. 4 and 5 illustrate the first rotary valve position, in which both the check control line 92 and the spool bottom feed line 94 are connected with the high pressure fluid line 88.

FIG. 6 illustrates the second rotary valve position, in which the spool bottom feed line 94 is closed off from the high pressure fluid line 88 and the check control line 92, and opened to the actuator fluid drain 90, while the check control line 92 remains connected with the high pressure fluid line 88.

FIG. 7 illustrates the third rotary valve position, in which the high-pressure fluid line 88 is isolated, and both the spool bottom feed line 94 and the check control line 92 are exposed to the actuator fluid drain 90.

INDUSTRIAL APPLICABILITY

There are several possible approaches for utilization of rotary valves for controlling HEUI-B™ and other type hydraulically controlled fuel injectors. Co-pending patent applications Ser. Nos. 09/213,594 and 09/213,687, now U.S. Pat. No. 6,050,496, for example teach rotary valves for switching connection of a fluid control line such as the check control cavity 34 between a fluid supply line and a fluid drain. Co-pending patent application Ser. No. 09/213,776, now U.S. Pat. No. 6,050,497 teaches a single rotary valve for connecting a fluid control line such as the check control cavity 34 to a hydraulic fluid supply line while simultaneously connecting another fluid control line such as the intensifier control passage 56 to a fluid drain, and vice versa.

However, those inventions to not allow for independent control of the check valve and the intensifier piston by a single valve. With this invention, high-pressure hydraulic fluid can be applied to the check valve without changing whether the intensifier control passage 56 is open to high-pressure hydraulic fluid. As a result, the check valve member 42 can be opened and closed with any shot separation without changing the hydraulic fluid pressure being applied to the top of the intensifier piston 64.

The invention could be practiced using a linear actuator, but the illustrated embodiments use the rotary actuator 78 to move the rotary valve 76 between the first, second, and third positions by rotating the axial member 80 connected with the rotary valve member 82.

In the first position illustrated in FIGS. 4 and 5, both the check control line 92 and the spool bottom feed line 94 are connected with the high-pressure fluid line 88. The high pressure actuation fluid in the check control cavity 34 flows down into the check control chamber 36 and pushes against the closing hydraulic surface 40 of the check valve member 42 to keep the check valve member in a position to close off the nozzle outlets 44.

Meanwhile, the high pressure actuation fluid in the spool bottom feed line 94 acts against the lower end hydraulic surface 52 of the spool valve member 28 to balance the hydraulic fluid pressure against the upper end hydraulic surface 26 of the spool valve member 28. Accordingly, the spool valve spring 54 keeps the spool valve member 28 in the up (closed) position that closes off the intensifier control passage 56 from the source of high pressure actuation fluid, while opening the intensifier control passage 56 leading to the intensifier piston 64 to the hydraulic fluid drain 58.

In the second rotary valve position illustrated in FIG. 6, the spool bottom feed line 94 is closed off from the high-pressure fluid line 88 and opened to the actuator fluid drain 90. This reduces fluid pressure against the lower end hydraulic surface 52 of the spool valve member 28. When this happens, the force of the high pressure actuation fluid on the upper end hydraulic surface 26 of the spool valve member 28 overcomes the force of the spool valve spring 54 and pushes the spool valve member 28 downward. This closes off the intensifier control passage 56 from the hydraulic fluid drain 58, while opening the intensifier control passage 56 to the source of high-pressure actuation fluid.

The high-pressure actuation fluid in the intensifier control passage 56 pushes down on the intensifier piston 64, which pressurizes fuel in the fuel pressurization chamber 66. The highly pressurized fuel flows through the connection passage 70 to the nozzle chamber 48 until fuel pressure in the nozzle chamber 48 is high enough to overcome the bias of the check spring 38.

However, the check valve does not open at this point because the check control line 92 is still connected with the high pressure fluid line 88, so that high pressure hydraulic fluid is still pushing against the closing hydraulic surface 40 of the check valve member 42. Even the very high fluid pressure of the pressurized fuel in the nozzle chamber 48 cannot overcome the combined force of the check spring 38 the high-pressure hydraulic fluid pushing against the closing hydraulic surface 40.

When the rotary valve 76 is moved to the third rotary valve position, illustrated in FIG. 7, the check control line 92 is finally exposed to the actuator fluid drain 90, which relieves the force of the high pressure hydraulic fluid pushing against the closing hydraulic surface 40. Now the pressure of the highly pressurized fuel in the nozzle chamber 48 can overcome the force of the check spring 38, and a check valve opens and fuel injection commences.

It can be appreciated that waiting until the fuel in the nozzle chamber 48 is fully pressurized and then opening the check valve by quickly relieving the pressure in the check control line 92 allows initiation of fuel injection to occur much more quickly and under better timing control than can be achieved by relying on the (comparatively slow) action of the intensifier piston 64 alone to cause initiation of fuel injection by pressurizing the fuel in the nozzle chamber 48.

After the injection "shot" is completed, a very quick cessation of fuel injection is achieved by returning the rotary valve 76 to the second position. The check control line 92 is once again filled with high pressure actuation fluid, which acts against the closing hydraulic surface 40 of the check valve member 42, even while the fuel in the nozzle chamber 48 is still pressurized. It can be appreciated that many rapid, successive "shots" can be performed in rapid succession at this point, by alternating the rotary check valve between the second position and the third position.

Finally, the rotary actuator 78 is used to rotate the rotary valve member 82 back to the first position, in which the spool bottom feed line 94 is closed off from the actuator fluid drain 90 and is exposed to high pressure hydraulic fluid from the high pressure fluid line 88. Once again, the high pressure actuation fluid in the spool bottom feed line 94 acts against the lower end hydraulic surface 52 of the spool valve member 28 to balance the hydraulic fluid pressure against the upper end hydraulic surface 26 of the spool valve member 28, allowing the spool valve spring 54 to move the spool valve member 28 upward to its closed position.

This closes off the intensifier control passage 56 from the source of high-pressure actuation fluid, while opening the intensifier control passage 56 leading to the intensifier piston 64 to the hydraulic fluid drain 58. When the pressure against the intensifier piston 64 is relieved, low-pressure fuel from the fuel inlet 68 can push the intensifier piston 64 upward, allowing more fuel to enter the fuel pressurization chamber 66 in preparation for the next injection cycle.

It can be appreciated that with this design the high pressure actuation fluid entering from the high pressure fluid line 88 will not bias the rotatable valve member either toward one position or the other, so that performance of the rotary valve should be independent of variations in the high pressure hydraulic fluid rail or other source of the high pressure hydraulic fluid.

Figure 8:
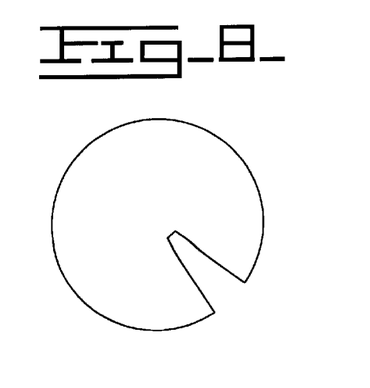
FIG. 8 is a diagrammatic representation of an example rotary valve fluid line access aperture.

The invention is not limited to the disclosed embodiments. For example, the embodiment shown in FIG. 4 uses a stepped motor to drive the rotary valve member 82, but a linear motor or any other method of a rotating the rotary valve member 82 may be used. As another example, in the embodiment illustrated in FIGS. 4–7 the various fluid lines are shown entering the rotary valve bore 84 from the side. In other embodiments fluid lines may enter from the top and/or bottom instead, or as well. For example it may be desired to have one or more of the fluid lines 88–94 enter through pie-shaped apertures such as that shown in FIG. 8, to increase possible fluid flow.

Countless other variations to the disclosed embodiments can also be made by those skilled in the art while practicing the claimed invention. Other aspects, objects, and advantages of this invention can be obtained from a study of the drawings, the disclosure, and the appended claims.

We claim:

1. An actuation fluid control valve assembly for a hydraulically actuated fuel injector, comprising:

a valve body defining an actuation valve bore and a spool valve bore;

an actuator connected with the valve body;

an actuation valve member disposed in the actuation valve bore;

a high-pressure fluid line;

a spool bottom line;

a check control line, each of the high-pressure fluid line, the spool bottom line, and the check control line terminating in the actuation valve bore;

an actuator fluid drain terminating in the actuation valve bore and being fluidly isolated from the high pressure fluid line by the actuation valve member;

a spool valve member slidably disposed in the spool valve bore between a first spool valve bore portion of the spool valve bore and a second spool valve bore portion of the spool valve bore, the first spool valve bore portion being fluidly connected with a high pressure fluid passage, and the second pressurization portion being fluidly connected with the spool bottom line, the actuation valve member being movable in response to the actuator to a first position at which both the check control line and the spool bottom line are fluidly connected with the high pressure fluid line, the actuation valve member being further movable in response to the actuator from the first position to a second position at which the check control line is fluidly connected with the high pressure fluid line and the spool bottom line is fluidly connected with the actuator fluid drain, the actuation valve member being further movable in response to the actuator from the second position to a third position at which both the check control line and the spool bottom line are fluidly connected with the actuator fluid drain, the actuation valve member being further movable in response to the actuator from the third position to the second position, and the actuation valve member being further movable in response to the actuator from the second position to the first position.

2. The actuation fluid control valve assembly of claim 1, wherein:

the actuation valve member is rotatable between the first position and the second position while the check control line remains in constant fluid connection with the high-pressure fluid line.

3. The actuation fluid control valve assembly of claim 1, wherein:

the actuation valve member is rotatable from the second position to the third position while the spool bottom line remains in constant fluid connection with the actuator fluid drain.

4. The actuation fluid control valve assembly of claim 3, wherein:

the actuation valve member is rotatable from the third position to the second position while the spool bottom line remains in constant fluid connection with the actuator fluid drain.

5. A method for controlling a hydraulically actuated fuel injector comprising a check, a nozzle chamber, and an electronically controlled actuator attached with an actuation valve member, comprising:

positioning the actuation valve member at a first position to reduce fuel pressure in the nozzle chamber;

causing pressurization of fuel in the nozzle chamber to an injection pressure and injection of the fuel from the nozzle chamber at the injection pressure by positioning the actuation valve member at a second position different from the first position; and hydraulically biasing the check to halt fuel injection from the nozzle chamber while keeping the fuel pressure in the nozzle chamber at the injection pressure, by positioning the actuation valve member at a third position different from the first and second positions.

6. The method of claim 5, wherein the actuation valve member rotates to move from one to another of the first, second, and third positions.

7. A method for controlling a hydraulically actuated fuel injector having a check, an intensifier piston, a nozzle chamber, and an electronically controlled actuator attached with an actuation valve member positionable at at least first, second, and third mutually distinct positions, comprising:

draining high-pressure hydraulic fluid biasing the intensifier piston, thereby reducing fuel pressure in the nozzle chamber and allowing fuel to enter the fuel injector, by positioning the actuation valve member at the first position;

causing high-pressure hydraulic fluid to provide hydraulic bias against the intensifier piston, thereby pressurizing fuel in the nozzle chamber to an injection pressure, while causing high-pressure hydraulic fluid to provide a closing bias on the check to prevent fuel injection, by positioning the actuation valve member at the second position; and causing fuel injection by draining the high-pressure hydraulic fluid providing the closing bias on the check, while continuing to cause high-pressure hydraulic fluid to provide hydraulic bias against the intensifier piston to keep fuel in the nozzle chamber at the injection pressure, by positioning the actuation valve member at the third position.

8. The method of claim 7, wherein positioning the actuation valve member at the at least first, second, and third mutually distinct positions is accomplished without hydraulic biasing of the rotary valve member favoring one of said positions over another of said positions.

9. The method of claim 8, wherein positioning the actuation valve member at the first position additionally causes high-pressure hydraulic fluid to provide a closing bias on the check to prevent fuel injection.

10. The method of claim 9, wherein the electronically controlled actuator rotates the actuation valve member between the first, second, and third positions.

11. The method of claim 8, wherein the electronically controlled actuator rotates the actuation valve member between the first, second, and third positions.

12. The method of claim 7, wherein positioning the actuation valve member at the first position additionally causes high-pressure hydraulic fluid to provide a closing bias on the check to prevent fuel injection.

13. The method of claim 12, wherein the electronically controlled actuator rotates the actuation valve member between the first, second, and third positions.

14. The method of claim 7, wherein the electronically controlled actuator rotates the actuation valve member between the first, second, and third positions.

* * * * *